(12) United States Patent
Solheim et al.

(10) Patent No.: US 10,860,658 B2
(45) Date of Patent: *Dec. 8, 2020

(54) PROVIDING A SEARCH SERVICE INCLUDING UPDATING ASPECTS OF A DOCUMENT USING A CONFIGURABLE SCHEMA

(71) Applicant: Microsoft Technology Licensing, LLC, Redmond, WA (US)

(72) Inventors: Helge Grenager Solheim, Oslo (NO); Rune Djurhuus, Oslo (NO); Evan Matthew Roark, Heggedal (NO); Bård Kvalheim, Oslo (NO); Michael Susaeg, Hosle (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/747,775

(22) Filed: Jun. 23, 2015

(65) Prior Publication Data

US 2015/0370791 A1 Dec. 24, 2015

Related U.S. Application Data

(63) Continuation of application No. 13/278,810, filed on Oct. 21, 2011, now Pat. No. 9,104,748.

(51) Int. Cl.
*G06F 16/93* (2019.01)
*G06F 16/23* (2019.01)
(Continued)

(52) U.S. Cl.
CPC ............ *G06F 16/93* (2019.01); *G06F 16/211* (2019.01); *G06F 16/2228* (2019.01);
(Continued)

(58) Field of Classification Search
CPC ....................................................... G06F 16/93
See application file for complete search history.

(56) References Cited

U.S. PATENT DOCUMENTS 6,070,158 A 5/2000 Kirsch et al.
6,088,706 A * 7/2000 Hild ........................ H04L 29/06
(Continued)

OTHER PUBLICATIONS

"Final Office Action Issued in U.S. Appl. No. 13/278,810", dated Jun. 28, 2013, 17 Pages.
(Continued)

*Primary Examiner* — James Trujillo
*Assistant Examiner* — Kurt A Mueller
(74) *Attorney, Agent, or Firm* — Merchant & Gould

(57) ABSTRACT

Embodiments provide indexing and searching features including the use of a configurable schema as part of providing partial update support of one or more aspects of an electronic document or documents, but are not so limited. In an embodiment, a system is configured to provide search services including partial update functionality based in part on use of a configurable schema to manage partial document updates and/or query processing operations. A method of one embodiment operates to use a configurable schema to define a number of merge sets that group various document attributes based in part on data source, update, and/or usage parameters to provide an efficient partial update mechanism. Other embodiments are included.

20 Claims, 7 Drawing Sheets

(51) Int. Cl.
*G06F 16/21* (2019.01)
*G06F 16/31* (2019.01)
*G06F 16/951* (2019.01)
*G06F 16/22* (2019.01)
*G06F 16/38* (2019.01)

(52) U.S. Cl.
CPC ............ *G06F 16/23* (2019.01); *G06F 16/319* (2019.01); *G06F 16/38* (2019.01); *G06F 16/951* (2019.01)

(56) References Cited

U.S. PATENT DOCUMENTS

| | | | | |
|---|---|---|---|---|
| 6,606,633 | B1* | 8/2003 | Tabuchi | G06F 17/21 |
| 7,142,690 | B2* | 11/2006 | Hyakutake | G06T 1/0021 358/3.28 |
| 7,433,940 | B2 | 10/2008 | Benfield et al. | |
| 7,516,162 | B2* | 4/2009 | Mochizuki | G06F 17/30011 |
| 7,730,069 | B2 | 6/2010 | Yamamoto et al. | |
| 7,756,922 | B2 | 7/2010 | Basu et al. | |
| 7,765,215 | B2 | 7/2010 | Hsu et al. | |
| 7,921,191 | B2 | 4/2011 | Benfield et al. | |
| 8,265,969 | B2 | 9/2012 | Comstock et al. | |
| 2003/0172168 | A1* | 9/2003 | Mak | G06F 17/30569 709/230 |
| 2006/0080316 | A1* | 4/2006 | Gilmore | G06F 17/30864 |
| 2006/0152755 | A1* | 7/2006 | Curtis | G06F 17/30696 358/1.15 |
| 2007/0179928 | A1 | 8/2007 | Basu et al. | |
| 2007/0282806 | A1* | 12/2007 | Hoffman | G06F 17/30067 |
| 2008/0263033 | A1 | 10/2008 | Vailaya et al. | |
| 2009/0228528 | A1* | 9/2009 | Ercegovac | G06F 17/30622 |
| 2010/0205160 | A1 | 8/2010 | Kumar et al. | |

OTHER PUBLICATIONS

"Non Final Office Action Issued in U.S. Appl. No. 13/278,810", dated Dec. 17, 2012, 16 pages.

"Notice of Allowance Issued in U.S. Appl. No. 13/278,810", dated Apr. 23, 2015, 9 Pages.

Lavee, et al., "Inverted Index Compression via Online Document Routing", In proceedings of the 20th International Conference on World Wide Web, Mar. 28-Apr. 1, 2011, 9 Pages.

Maxwell, Russ, "Troubleshooting Security Only Crawl—SharePoint Brew", Published on: Feb. 8, 2009, Available at: http://blogs.msdn.com/b/russmax/archive/2009/02/09/troubleshooting-security-only-crawl.aspx.

Park, et al., "Rapid and Robust Ranking of Text Documents in a Dynamically Changing Corpus", In Proceedings of the 6th ACS/IEEE International Conference on Computer Systems and Applications, Mar. 31, 2008-Apr. 4, 2008, 7 Pages.

"[MS-FSCF]: Content Feeding Protocol Specification", Published on: Jun. 8, 2011, Available at: http://msdn.microsoft.com/en-us/library/ee626835(v=office.12).aspx.

"[MS-OFCGLOS]: A. See Definition for Anchor Crawl", Published on: Sep. 12, 2011, Available at: http://msdn.microsoft.com/en-us/library/dd906553(v=office.I2).aspx.

"2.2.40 cht::documentmessages::partial_update_operation", Published on:Sep. 12, 2011, Available at: http://msdn.microsoft.com/en-us/library/ee627165(v=office.12).aspx.

"2.2.5.1 MSSAnchorChangeLog", Published on: Sep. 12, 2011, Available at: http:/ /msdn.microsoft.com/en-us/library/dd931458.aspx.

"3.1.1.25 Crawl Component Status", Published on: Sep. 12, 2011, Available at: http://msdn.microsoft.com/en-us/library/dd957472.

"What Is SharePoint Server Search?", Retrieved Date: Oct. 19, 2011, Available at: http://sharepoint.microsoft.com/en-us/product/capabilities/search/Pages/SharePoint-Search.aspx.

"Office Action Response in U.S. Appl. No. 13/278,810", dated Mar. 12, 2013, 11 Pages.

"Office Action Response in U.S. Appl. No. 13/278,810", dated Sep. 20, 2013, 11 Pages.

"Advisory Action Issued in U.S. Appl. No. 13/278,810", dated Nov. 20, 2013, 3 Pages.

"Office Action Response in U.S. Appl. No. 13/278,810", dated Nov. 26, 2013, 11 Pages.

"Office Action Response in U.S. Appl. No. 13/278,810", dated Jun. 16, 2015, 6 Pages.

* cited by examiner

PROVIDING A SEARCH SERVICE INCLUDING UPDATING ASPECTS OF A DOCUMENT USING A CONFIGURABLE SCHEMA

CROSS-REFERENCE TO RELATED APPLICATIONS

This application is a continuation application and claims priority to U.S. patent application Ser. No. 13/278,810, filed Oct. 21, 2011, entitled "PROVIDING A SEARCH SERVICE INCLUDING UPDATING ASPECTS OF A DOCUMENT USING A CONFIGURABLE SCHEMA," now issued U.S. Pat. No. 9,104,748, which application is incorporated herein by reference in its entirety.

BACKGROUND

Electronic documents can be large and costly to parse, process, and index, due in part to the quantity of information used to substantiate and track aspects of each electronic document. Partial update support refers to an ability to update parts of an indexed document without having to send in the entire document content, including all meta-properties, to the search engine. Supporting partial updates is difficult for a search service due in part to having to split documents into inverted indexes sorted by words, wherein each word references a list of documents containing the word.

Words from multiple document properties are typically bundled in the same indexing structures, wherein multiple indexing fields are handled as combined entities. Extracting original documents and making minor modifications to some properties in such structures can be costly and too time consuming in practice. Therefore, in practice, indexes are often made immutable, and new versions of complete documents are created in new index fragments while the old document versions in the old index fragments are marked as invalid using a mechanism sometimes referred to as exclusion-listing.

Re-indexing a complete document is costly and inefficient when only a minor change is needed. Incremental indexing is typically necessary for any search services where content is steadily updated or growing over time. If indexes are not merged on an ongoing basis, query performance suffers due in part to the large numbers of index partitions. Even though supporting partial updates can be costly and difficult, partial update support is typically needed since clients are not always capable of sending in every property of a document when wanting to make an update.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide indexing and searching features including the use of a configurable schema as part of providing partial update support of one or more aspects of an electronic document or documents, but are not so limited. In an embodiment, a system is configured to provide search services including partial update functionality based in part on use of a configurable schema to manage partial document updates and/or query processing operations. A method of one embodiment operates to use a configurable schema to define a number of merge sets that group various document attributes based in part on data source, update, and/or usage parameters to provide an efficient partial update mechanism. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
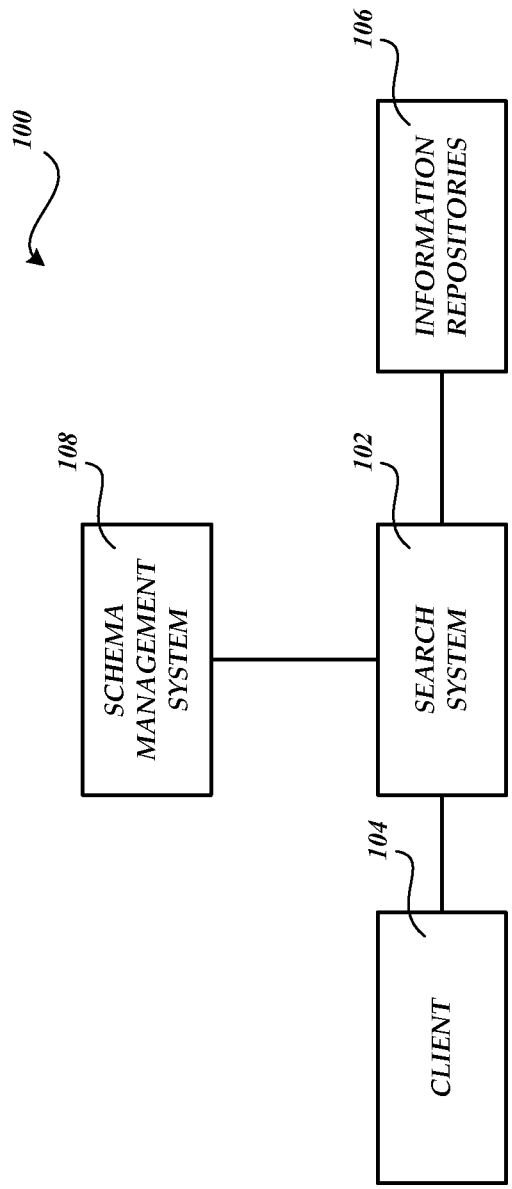
FIG. 1 is a block diagram of an exemplary computing environment.

FIG. 1 is a block diagram of an exemplary computing environment 100 that includes processing, memory, and other components/resources that provide indexing, searching, and/or other information processing operations. Components of the environment 100 include features and functionalities to provide partial document update and management support as part of providing a searching service, but are not so limited. As described below, data in a main merge set can be managed using the same update cycle, and data of different merge sets are on different update cycles to provide a responsive search service.

Figure 2:
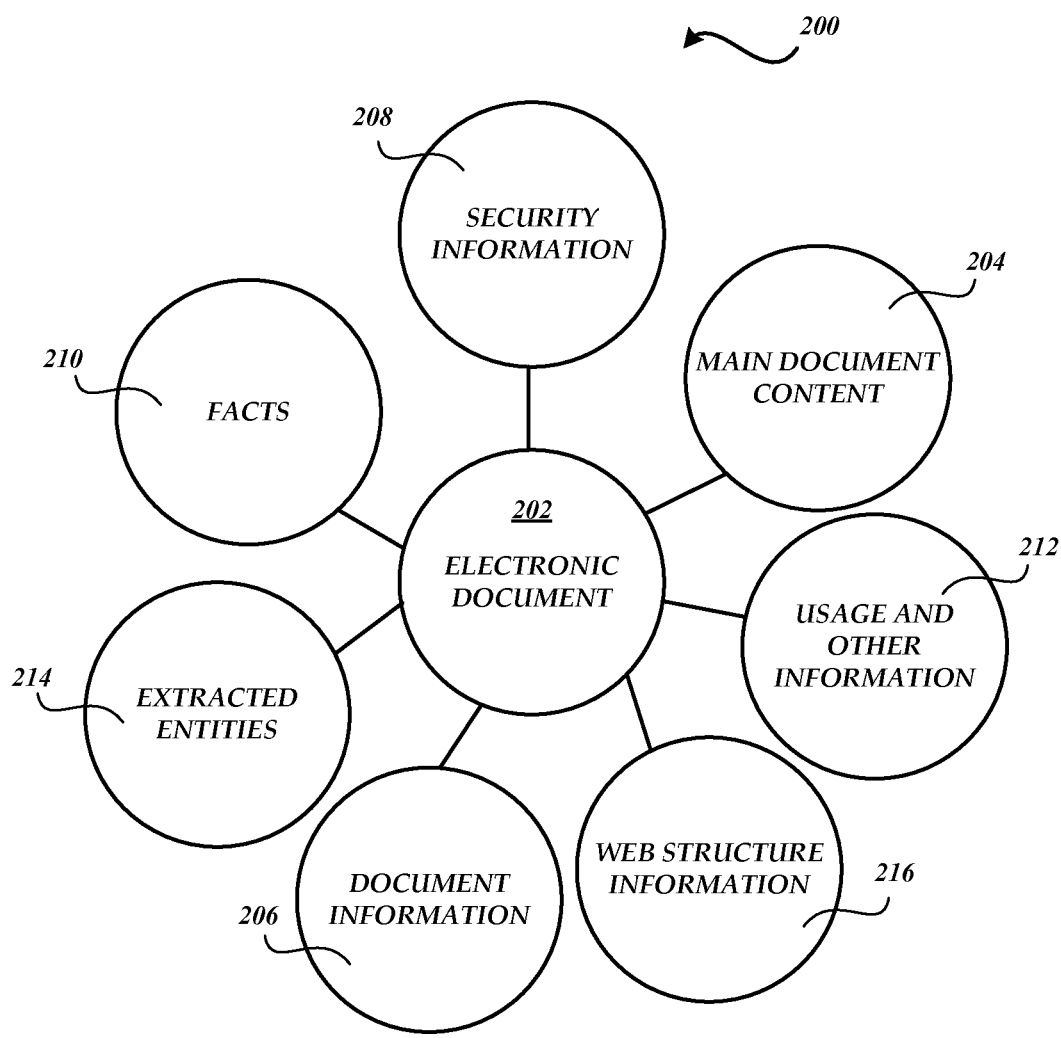
FIG. 2 is a graphical representation that depicts a number of exemplary properties that can be associated with electronic documents.

Partial updates can include distributing or portioning a document into separate parts in a manner consistent with an update cycle and/or usage patterns for information and/or properties that constitute electronic document parts (see FIG. 2 for example). As described below, a search service uses a configurable schema representation in part to enable definition and evolution of partial update structures that can be used to provide a responsive search experience.

In an embodiment, components of the environment 100 are configured in part to provide partial update functionality that includes the use of a configurable schema architecture and splitting/parsing documents into separate parts in a manner consistent with an update cycle and/or usage patterns (e.g., timestamps of last update) for properties that constitute the document parts. As an example, a configurable schema architecture can be used by a domain expert, familiar with the documents, content sources, and domains in question to predefine how document properties are to be grouped in merge sets, thus allowing a system/component to adapt to an actual expected usage and/or update cycle. Partial update support enables updating parts of an indexed document absent having to send in the entire document content, all meta-fields etc. to a search engine or other component(s). For example, partial update support can be used to isolate select document portions for update and management operations, such as a new security access control list (ACL), updated link text, click-through text from an analysis processing engine or new static boost values for a document as examples.

As described below, a core search engine feature uses indexed fields associated with a number of managed properties that are managed using a number of merge sets and associated index representations. A managed property of an embodiment can be created from multiple crawled properties, and can use suitable processing operations for various update and/or management scenarios. Components of the environment 100 can be configured to impart incremental indexing functionality to create new index partitions based in part on merging of existing index partitions. Since a job of merging indexes can be resource intensive, a partial update process can be used to enable responsive performance characteristics of a search service, including providing document consistency.

As described below, partial update support is provided in part using a configurable schema representation that defines target merge sets that are used in part to track aspects of an electronic document, including functionality to partially update one or more document portions using one or more target merge sets. A searching service of an embodiment can obtain document information associated with the constituent parts, and group parts of the electronic document into multiple independent indexes to manage one or many document attributes or properties, wherein designated document parts can be updated independently of the other document parts as part of providing a searching service. Components of the environment 100 can be configured to define and use merge sets, such as groups of document properties for example to allow for usable and efficient partial updates. In an embodiment, property data in a main merge set is managed using a first update cycle, and property data managed on different update cycles can be included in different merge sets for responsive performance and usability.

The components of the environment 100 can operate to provide partial updates of documents in a search engine index by partitioning all index fields into disjoint merge sets, including enabling updates to individual merge sets. As one example, a system administrator or other user/component can group index fields into target merge sets based in part on an expected usage and/or update cycle of the grouped index fields. New system features, usage scenarios, and/or document parts may change the merge sets dynamically at later times. According to one embodiment, all index fields in the same merge set can be simultaneously updated, and any number of merge sets can be updated by a partial update process.

As shown in FIG. 1, the exemplary environment 100 includes a search system 102 communicatively coupled to one or more clients 104 and/or one or more information repositories 106. The search system 102 is also communicatively coupled to a schema management system 108. In one embodiment, the information repositories 106 are used to provide crawled data associated with a number of site collections, sites, farm content, etc. In one embodiment, the search system 102 can be used in conjunction with the schema management system 108 as part of providing a search service that includes the use of partial update features including the use of schema-driven merge sets as part of managing updates of different document parts.

The schema management system 108 of an embodiment provides configurable schema features and functionality, but is not so limited. For example, the configurable schema functionality can be used to manage changes to document properties mapped to various merge sets using explicit schemas, including modification of properties and/or property types. As an example, the schema management system 108 provides an interface to a user or system administrator using a web user or service interface web or any other remote or local interface through which it is convenient to communicate with the schema management system 108. The schema management system 108 can be configured to translate user interactions to calls to a schema processing component that operates to persist the schema information in a schema storage component. The schema storage component of an embodiment can be configured to contain a list of document properties, and for each document property define which merge set the property belongs to and thus effectively grouping the document properties and splitting the documents into constituent parts.

The search system 102 interacts with the schema management system 108 in part by reading schema information (e.g., merge set information) through a well-defined interface to obtain the proper field and query mappings. During query time, the search system 102 operates to account for multiple merge sets used to manage a partial update and/or search process. In an embodiment, a field splitter feature can be used to examine a received query and send query parts to corresponding merge set(s), using schema and mapping information managed by the schema management system 108. When the results from each merge set are returned, the field splitter feature can operate to generate an overall result set for further result processing.

With continuing reference to FIG. 1, the search system 102 of an embodiment includes indexing features used to process any number of searchable items including, but not limited to, web pages, documents of any kind, spreadsheets, music files, picture files, video files, contacts, lists and list items, tasks, calendar entries, content of any kind, metadata, meta-metadata, etc. The search system 102 of one embodiment includes features that operate, but are not so limited, to: create indexes based on raw textual input and/or return results for queries by using the indexes; receive content from various clients, crawlers, connectors, etc. which can be processed and indexed; and/or parse information including documents and other content to produce a textual output, such as a list of properties including document title, document content, body, locations, size, etc. as examples.

As described below, as part of partial update functionality, components of the environment 100 can provide a search service that operates to group document properties/parts based in part a source of data (e.g., the same source of data) and associate each property group with a merge set, wherein an update cycle can be used to manage property and/or schema updates using one or more existing merge sets. A search service of an embodiment operates uses the search system 102 that interacts with other components operable to receive, process, and/or transmit partial document structures, such as documents for which certain ones of the properties are missing or different.

The search system 102 of one embodiment is configured to send the correct properties/parts to the proper merge sets according to a configurable schema that is used in part to group aspects of electronic documents, including meta-properties and/or other information into target merge sets. In an embodiment, the search service can use explicit schemas and a schema engine as part of managing a partial update process. In an embodiment, the search service uses a separate index representation for each merge set according to the types of properties being managed. Each index can include different types of index fields depending on properties being managed using the corresponding merge set.

FIG. 2 is a graphical representation 200 that depicts a number of exemplary properties that can be associated with electronic documents, such as word processing and other electronic documents for example. As shown in FIG. 2, an electronic document can include a plurality of constituent parts or portions. Exemplary electronic document portions can include a document identifier(s) 202, such as a uniform resource locator (URL) and/or title; main content 204, such as the text of a word processing document for example (e.g. most of the text in an electronic word processing document); document information 206 or metadata, such as properties that describe the electronic document (e.g., author, creation time, modification time, etc.); security information 208 that can be used to determine the principals who have access to interact in various ways with the electronic document; search engine facts 210, such as document links, queries, maps, etc.; usage and recommendation related information 212, such as click-through rank, user ratings, static rank boosts, etc.; extracted entities 214, such as people, locations, companies, etc.; and/or web structure information 216, such as anchor texts, static anchor boost, etc.

Partial update features and functionality can be integrated with a search and index service using various parameters, such as source data parameters, update parameters, and/or usage parameters. A partial update mechanism of an embodiment accounts for the fact that different document portions and/or properties have a number of different characteristics concerning the source of the data, update cycle(s), and/or how data is used. As an example, a source of data can be actual content management systems or analysis systems/jobs, such that: main document content can originate from and/or be maintained by content sources such as file servers, collaboration servers (e.g., SHAREPOINT servers), databases and/or other content management systems; security information can originate from and/or be maintained by the same content sources as the main document content, but may utilize other APIs to acquire the security-related data; web structure properties can originate from independent analyses running analyses of total page link structure of a set of documents and/or assign static rank values to the documents depending on how many other documents point thereto (amongst other parameters); usage and recommendation properties can be provided by extracting real usage information about the documents.

As described above, partial update services can also support update cycles associated with document parts or portions. As an example, an update cycle can be used to update document content independently from security settings. In one embodiment, updates can be associated with: scheduled jobs that re-crawl content sources and input changed data; web structure properties when the proper analyses jobs have completed, wherein the analyses jobs of an embodiment are on a different schedule than the crawl jobs (e.g., typically run less often); and/or usage and recommendation properties based on the actual usage that may need to be updated even if the document content and/or security information has been updated (same may apply to web structure properties).

Partial update services can also be configured according to usage parameters. Document parts, including various document properties can be used to form end-user and/or application queries to search for documents. Since security information is used to protect information and/or documents, in an embodiment, such information or portions thereof can be used to trim result sets according to current user, and need not be used to evaluate the real user query. Web structure properties and usage and recommendation properties can be used to rank documents and/or adjust a rank according to the documents use, ratings, link structure, etc. Other properties/parts may be used to federate result sets with data from other sources such as databases, legacy back-end systems, and/or other search engines.

The table below includes a number of exemplary document properties that can be utilized by a search service, including a schema management component to define a schema for one more document merge sets.

TABLE

| Field name | Description | Update group |
| --- | --- | --- |
| AboutMe | For a contact, or the author of a document, a description of the person | |
| Anchortextpartial | List of anchor texts in documents pointing to this document | Link |
| AssignedTo | Name of assignee (if task or similar) | |
| Author | All forms of name of the author who wrote this document | |
| Body | The body text of the item | |
| Charset | The character set used in the document | |
| Colleagues | List of colleagues, for e.g a contact | |
| Companies | Company names found in the item using property extraction | |
| Contentclass | Type of document | |
| ContentSource | Origin of document | |
| Created | Creation date for the item | |
| CreatedBy | Name of creator | |
| Department | Department of contact if this is a contact, or department of author if a document | |
| Description | Any kind of free-text description of this item | |
| Docacl | List of security principals allowed to see this item | Security |
| Docaclsystemid | Security system principals for this item belong to | Security |
| DocComments | Free-text comments | |
| DocKeywords | Free-text keywords | |
| Docrank | Static rank-value of document (a rank score which is independent of query) | Link |
| DocSubject | Subject for this item | |
| Docvector | A similarity vector representation for this item | |
| Domain | URL domain, e.g., www.contoso.com | |
| DuplicateHash | A document signature for the item | |
| EndDate | For a task, when it ends | |
| ExpirationTime | When the item is no longer valid | |
| File Extension | A file extension | |
| Filename | Name of original file | |
| FirstName | Name of contact | |
| Format | Symbolic representation of the item format, e.g., Internet HTML | |
| HostingPartition | GUID representing tenant to which this item belongs in a cloud-based or shared deployment | |
| Interests | If a contact, details about that contact | |
| JobTitle | Job title of a contact | |
| Keywords | Additional keywords | |
| Language | Detected written language for | |

TABLE-continued

| Field name | Description | Update group |
|---|---|---|
| | the item. For multi-lingual items, this is the primary language detected | |
| Languages | Detected written languages for the item. Contains all detected languages for multi-lingual items | |
| LastModifiedTime | Last time this indexed version of the item was updated (may be newer in the source) | |
| LastName | Name of contact | |
| Location | Item location | |
| Locations | Geographical locations found in the item using property extraction | |
| ManagedProperties | Tracking all managed properties in use for each document | |
| Memberships | List of groups a contact is a member of | |
| MetadataAuthor | Name of person who created various metadata | |
| MobilePhone | Phone no. of a contact | |
| ModifiedBy | Name of last person modifying this item | |
| PastProjects | List of projects a contact has worked on in the past | |
| Path | Path to this item | basic |
| personnames | Person names found in the item using property extraction | |
| PictureHeight | Description of an optional picture going with the item | |
| PictureThumbnailURL | Description of an optional picture going with the item | |
| PictureURL | Description of an optional picture going with the item | |
| PictureWidth | Description of an optional picture going with the item | |
| PreferredName | Preferred name of a contact | |
| Priority | Priority number of this item | |
| ProcessingTime | Date/time when the item was processed by item processing | |
| Pronunciations | Pronunciations of a contacts name | |
| Purpose | What the item is used for | |
| RecommendedFor | Who this item is recommended for | Usage |
| Responsibilities | A contacts responsibilities | |
| Schools | List of schools attended by a person | |
| Site | Site that a document originates from | |
| SiteName | The URL of the site that contains the crawled item. If the crawled item is not contained in a site, this property is absent. | |
| SiteRank | Score reflecting the expected quality of the site the document came from | Link |
| SiteTitle | Title of the item's site | |
| Size | Size of the item | |
| Skills | Skills of a contact/person | |
| StartDate | A start date, e.g., a task start date | |
| Status | Status of the item, e.g. ready for review | |
| Tags | Any user defined tags | |
| Teaser | A query independent document summary for this item | |
| Title | Title for the crawled item | basic |
| TLD | Top level domain for a document | |
| Url | The URL of the matching item | basic |
| UrlKeywords | The individual (key)words of an URL string | Link |
| Urls | A list of all URLs that point to the item (including duplicates and hypertext markup language (HTML) redirects) | Link |
| UserName | some system-related user name of a contact | |
| UserProfile_GUID | user id of a contact | |
| ViewsLastDays | Number of views last days | usage |
| WorkEmail | e-mail address of a contact | |
| WorkPhone | phone no of a contact | |

Figure 3A:
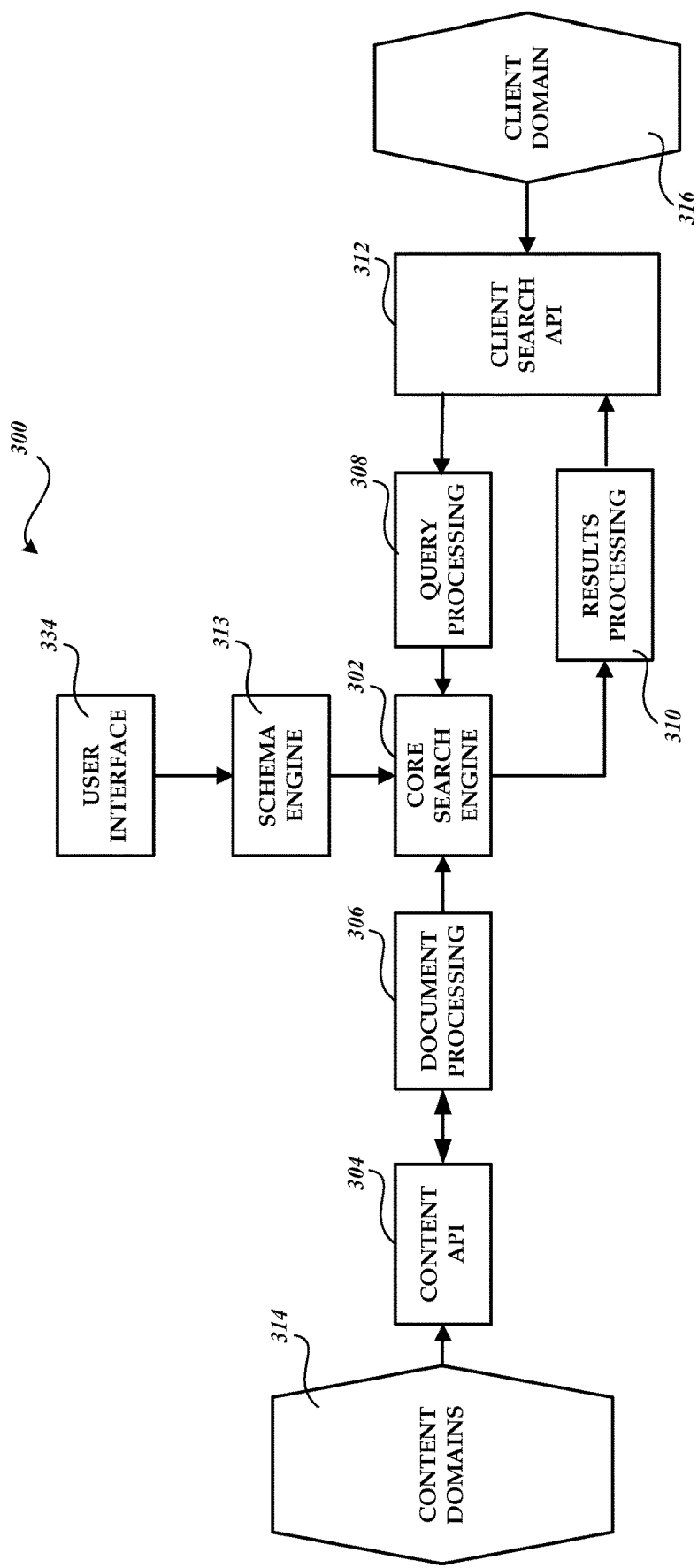
FIGS. 3A-3C are block diagrams that depict components of an exemplary search service or system configured in part to provide indexing and searching services.
Figure 3B:
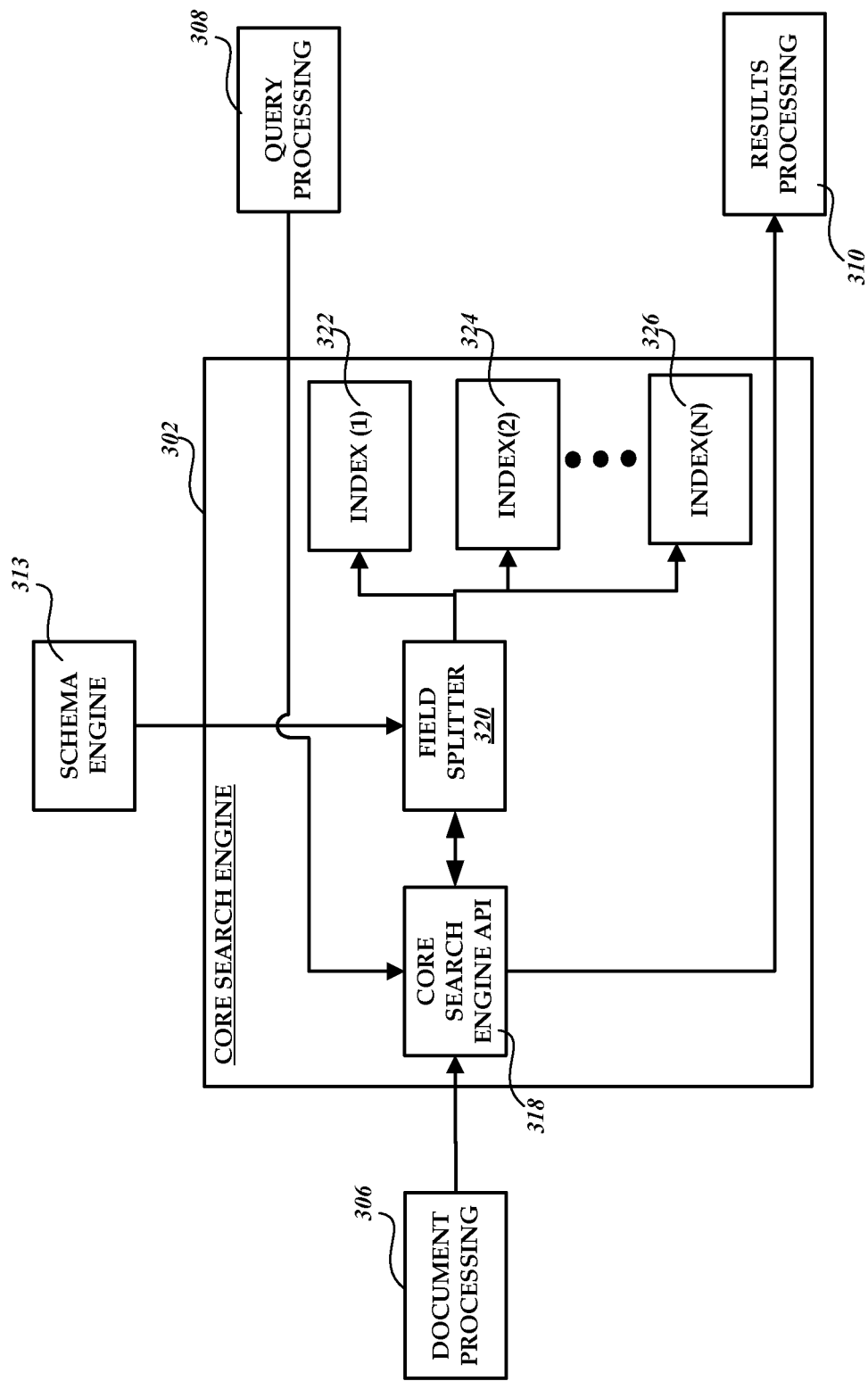
Figure 3C:
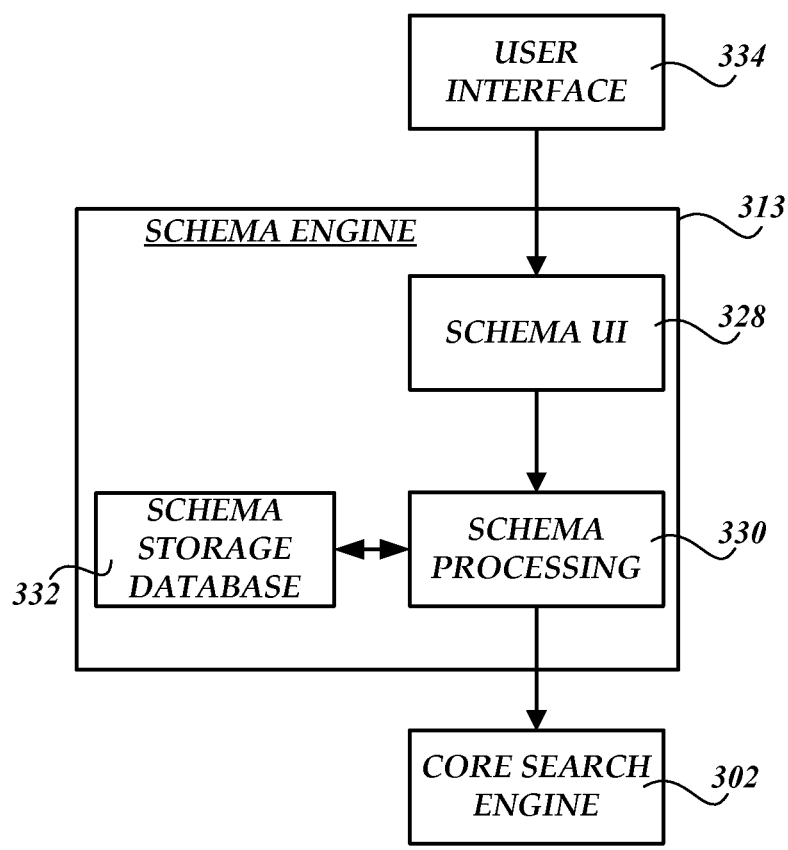

FIGS. 3A-3C are block diagrams that depict components of an exemplary search service or system 300 configured in part to provide indexing and searching services, including the use of a partial update process, but is not so limited. As shown in FIG. 3A, the exemplary system 300 includes a core search engine 302, a content application programming interface (API) 304, item or document processing 306, query processing 308, results processing 310, a client search application programming interface (API) 312, and a schema engine 313.

The search service, as part of providing robust search operations and results, can include a computing architecture that uses processor(s), memory, hard drive storage, networking, and/or other components. A computer storage medium can be configured with instructions that, when executed, operate to provide certain partial update features, such as program instructions encoded as part of a computer program or programs. In some embodiments, component features and/or functionalities can be further combined and/or subdivided.

The core search engine 302 includes functionality to perform various document operations including, but not limited to, add and/or update operations, partial update operations, and/or delete operations. An add and/or update operation of an embodiment operates to create a document entry if no such entry exists, and/or update all merge sets with values from an input document. A partial update operation of an embodiment operates to update only target merge sets for any associated included properties of an input document. A delete operation of an embodiment operates to delete a document, including associated properties, completely.

The core search engine 302 includes functionality to create indexes based on raw textual input and return results for queries by using the indexes, including different indexes that are maintained based on corresponding document merge sets. The content API 304 is used by various clients, crawlers, connectors, etc. (e.g., content domains 314) to submit and receive content for subsequent processing and indexing operations. Item processing 306 is used to parse documents and other content to produce textual and other output, such as a list of properties for example (e.g., document title, document content, body, locations, size, etc.).

Query processing 308 operates to analyze raw user input (e.g., query), including improving and/or rewriting a query for execution using the core search engine 302. For example, query processing 308 can be configured to detect language, correct spelling errors, add synonyms to a query, rewrite abbreviations, etc. Results processing 310 operates to process results provided by the core search engine 302 before they are returned. For example, the core search engine 302 contains ranking and relevancy algorithms and results processing 310 contains sorting, filtering, and/or federation (e.g., uses data from other data sources such as BING search engine, stock exchange data, current weather reports/forecasts or other features used in part to return relevant search results. The client search API 312 is used by search front-end and other applications (e.g., client domains 316) to issue queries and retrieve results using the queries.

In one embodiment, the system 300 can also include an alerting engine that operates to store queries and analyzes all incoming (e.g., crawled or fed) documents. For example, when a new document matches a query, the altering engine can send out an alert to any subscribers of the alert. The exemplary system 300 can be used to provide rich searching services, including providing a store for partial update support, domain-wide terms, keywords, content types, and/or other data and/or parameters. As an example, searching services can provide partial document update support shared and hosted as part of the same server farm or hosted on a dedicated services farm and/or on different farms. Cross-farm and single-farm services can also be implemented.

FIG. 3B depicts and focuses in on exemplary components of the core search engine 302 in accordance with an embodiment. As described below, partial update functionality and/or support is provided based in part on how documents are submitted or communicated using the content API 304. As shown in FIG. 3B, the search engine 302 includes a core search engine API 318, a field splitter 320, and a plurality of index structures 322-326 corresponding an index associated with a first merge set, an index associated with a second merge set, and an index associated with an $n^{th}$ merge set, respectively.

As shown for this example, and in accordance with an embodiment, the core search engine API 318 is communicatively coupled (e.g., wired and/or wirelessly) with document processing 306, query processing 308, results processing 310, and the schema engine 313. More particularly, and according to such an embodiment, the core search engine API 318 is receiving inputs from document processing 306 and query processing 308, while outputting information to results processing 310 and the field splitter 320, but is not so limited. The schema engine 313 is also outputting information to the field splitter 320.

The field splitter 320 of an embodiment is responsible for sending the different document properties to the proper merge set, including the proper collection of indexing structures for the various document properties/portions. The schema engine 313 or schema management component, is configured to manage the schema(s) which is a definition of fields in the index needed and the corresponding attributes, including a merge set or sets that the fields belong to. The field splitter 320 of an embodiment operates to split and/or manage the fields into merge sets based in part on an assigned document ID. The field splitter 320 is configured to send/transmit the document ID with the pertinent properties to a delineated merge set as part populating the merge sets in conjunction with providing the partial update functionality. According to an embodiment, the field splitter 320 uses one merge set as the main merge set, wherein a document exists the main merge set includes an entry for the document (e.g., document ID and/or URL).

The field splitter 320 can be configured to perform various operations based in part on whether an operation is a partial update operation, regular add/update operation (e.g., insert operation), and a delete operation. When mapping properties and/or values to merge sets, the field splitter 320 can operate to send one partial update to every merge set that has properties in the incoming document. If a merge set has multiple fields, the field splitter 320 of an embodiment can operate to update all properties at the same time, wherein fields not present in or absent from a partial update document are considered to have NULL values. If no properties for a merge set are associated with the input document, the field splitter 320 does not alter values for the document in a merge set.

During a regular add/update operation, all properties in the main merge set need to have values, otherwise the field splitter 320 ignores the add operation. The field splitter 320 can create entries for every merge set for which there are properties for the input document. Properties that are not present in or absent from the document are considered by the field splitter 320 to have NULL values. The field splitter 320 can also delete a document entry in one or more merge sets with no properties associated with the input. During a delete operation, the field splitter 320 of an embodiment can be configured to send a delete instruction or instructions to every merge set.

During query time, a query issues from query processing 308 to the field splitter 320 using the core search engine API 318. As part of accounting for multiple merge sets, the field splitter 320 examines the query and sends parts of the query to the corresponding merge set, using the information received from the schema engine 313. For example, if a query is author:Shakespeare, only the merge set (e.g., 324) that holds an author property receives the query. When the results from each merge set are returned, the field splitter 320 operates to generate an overall result set for the query which is output to the result processor 310 using the core search engine API 318. In an embodiment, the overall result set includes a total result set from all merge sets, calculated using intersection or union operations. Depending on global settings, configuration, and/or per query parameters, the field splitter 320 output may or may not involve all or only some certain number of the merge sets. For example, ACL parameters of a security merge set are rarely returned with a result set.

As an illustrative example, consider the query "title:tiger AND author:calvin". The core search engine 302 can operate to return documents with the word "tiger" in the title that also have "calvin" as the author as defined by the managed property. If the title and author document properties are in different merge sets, the field splitter 320 can operate to send "title:tiger" to a dedicated merge set and "author::calvin" to another dedicated merge set. After populating each merge set, the field splitter 320 can operate to merge the results sets from each merge set into an overall correct result set. In an embodiment, the field splitter 320 can use a merge process that utilizes a shared or common document ID present in each of the merge sets to identify the proper document.

A merge process of an embodiment can be based in part on using sorted lists of document IDs that are shared in all merge sets. A result set can be defined as a list of document IDs matching the query. In one embodiment, query and result processing operations include two passes: 1) uses a query to obtain all matching documents IDs, and 2) communicates (e.g., max 10) the document IDs, requesting document summaries for the corresponding documents. If a query is an AND between two properties in different merge sets, the field splitter 320 can operate to perform an INTERSECTION operation between the two lists of documents IDs returned (UNION operation for OR operators). If the title and author document properties are in the same merge set however, the field splitter 320 operates to forward the query to the containing merge set and also outputs the query results to result processing 310 using the core search engine API 318.

When query processing 308 requests document summaries, the core search engine 302 can return the given properties for the requested documents. A document summary can include managed property stored with a document in an index that can be returned, such as a snippet of the original document text. In an embodiment, the snippet can be combined with the query to be shortened further, or returned as is. A document summary can also include other information, such as a picture, video, etc. The field splitter 320 of an embodiment can operate to receive the request and retrieve the fields in question from the merge sets they are stored in.

The field splitter 320 can also be configured to calculate a final ranking for documents by merging the partial rank scores from the various merge sets. Ranking operations include sorting of results, which can include assumed best results ranked first. This is usually a sum of different factors. Each merge set gives factors for the properties from those merge sets. The overall ranking can be configured as weighted sum/product of the sums from each merge set. Attribute vectors can be used for sorting results sets and/or to create refiners. The field splitter 320 can operate to send refiner requests to any relevant merge set(s) and return an overall set of refiners. For sorting, the field splitter 320 can operate to retrieve the correct sort order from a merge set. If multiple fields are used for sorting, the field splitter 320 can operate to combine the sorting returned from the involved merge sets.

As shown in FIG. 3C, the schema engine 313 of an embodiment provides a schema management service and includes a schema UI component 328, schema processing 330, and a schema storage database 332, but is not so limited. The schema engine 313 provides an interface 334 to a user, system administrator, component, device, system etc. using the schema UI component 328. For example, the schema UI component 328 can be configured and used as part of a web-based or other user interface that uses hypertext markup language (HTML), SILVERLIGHT, AJAX, JAVA, or other coding technologies, a web service interface (e.g., SOAP, WCF, JSON, etc.), or any other remote or local interface through which it is convenient for a user to communicate or interact with the system 300.

The schema UI component 328 of an embodiment is configured to translate user interaction to calls to schema processing 330 which is responsible for persisting the schema information in the schema storage database 332. The schema storage database 332 of an embodiment is configured to contain a list of document properties, and for each document property define which merge set the property belongs and thereby group document properties according to a grouping definition/criteria for further storage and use. It will be appreciated that not all documents will include all properties, but each existing document property can be mapped to one single merge set (e.g., the main merge set). The core search engine 302 of an embodiment interacts with the schema engine 313 by reading schema information, including merge set information using the schema UI component 328 to obtain the proper field and/or query mappings.

As described above, components of the exemplary system 300 can be configured to manage document update, tracking, and/or searching features when various document properties come from different content sources and/or have different update schedules, but is not so limited. For example, components of the exemplary system 300 enable the use and availability of partial updates without the need of immutable index structures or storing complete versions of already processed and/or indexed documents.

The system 300 of an embodiment uses a number of update or merge group types as part of providing a search service and/or interface (e.g., intranet, internet, etc.) including a basic group, a default group, a security group, a usage group, and/or a link group. Additional group types can be used, such as a custom property group type for example to separate information (e.g., security, pricing, etc.) in a different source system(s) than other portions of an electronic document. Additionally, existing groups can be modified for users having certain use and/or interaction permissions. The basic group of an embodiment is configured to include one or more required properties for a document to exist in the system 300, such as a document URL or document ID for example. The basic group can be used to quickly include a document in an index and may include a finite number of properties (e.g., greater than one but less than five properties). The basic group can be configured as the main merge set described above which enables a document to be partially searchable very quickly with only limited document processing and/or resources.

The default group of an embodiment is configured to include the main parts or properties of a document such as e.g. the main document text or body of an HTML document. The security group of an embodiment is configured to include the security related properties, such as a document ACL, security type, etc. The usage group of an embodiment is configured to include properties related to usage of a document (in a source system and/or as part of the search results) and can be updated by an analysis engine at intervals or cycles different from one or more other merge sets. The link group of an embodiment is configured to include properties related to how a document relates to other documents and can be updated by an analysis engine at intervals or cycles different from one or more other merge sets.

Update processing of an embodiment includes updating the usage group and the link group at the same time but at a different time from one or more of the basic group, default group, and/or security group. In one embodiment, the basic group and default group can be updated at the same time according to an update cycle or interval useful for content management systems (e.g., SHAREPOINT services). For example, merge sets associated with the basic and default group can be defined to include document information, such as data, metadata, meta-metadata, etc. (e.g., author(s), version(s), document type(s), URL, and/or title, etc.) and main document content can be merged into a single merge set and referred to by the schema engine 313 and/or core search engine 302 as part of update and/or maintenance operations. Update processing can effectively use update groups for certain update parameters, such as security parameter updates for example. As an example, in a medium or large organization, the list of individuals or groups having access to a document typically changes more often than the document content itself. To keep the security trimming in search based on indexed document access control list (docacls) that comprises a list of users and groups that have (or are denied) access to a particular document up to date, which can be fed into the system with very little document processing and updated quickly and at low processing cost.

Figure 4:
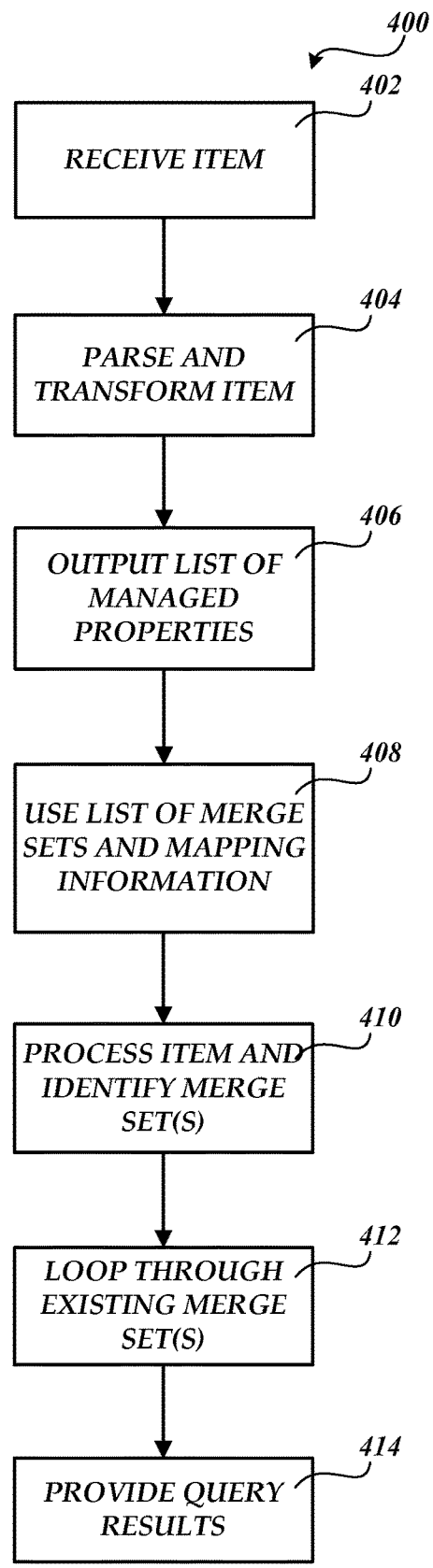
FIG. 4 is a flow diagram depicting an exemplary process of providing a searching service including partial update functionality based in part on use of a number of merge sets and schema management features.

FIG. 4 is a flow diagram depicting an exemplary process 400 of providing a searching service including partial update functionality based in part on use of a number of merge sets and schema management features, but is not so limited. At 402, the process 400 receives an item, such as an electronic document for example. For example, a user or external system or crawler can submit an electronic document representation as a set of crawled properties (e.g., document, metadata, meta-metadata, etc.).

At 404, after receiving the item, the process 400 parses the item and transforms one or more crawled or submitted properties (e.g., linguistics processing, spell checking, synonym replacement, extraction and recognition of entities such as people, names, locations, companies etc., as well as expanding abbreviations and other types of data-cleansing using external organization databases, product databases, etc.) to one or more managed properties. At 406, the process 400 operates to output a list of managed properties for the item. For example, the process 400 at 406 can operate to output a list of managed properties to an indexing component of a core search engine for use in partial document update operations using one or more merge sets that are configured to include different types of managed properties and managed according to an update cycle or other process.

At 408, the process 400 operates to use (e.g., retrieve or receive) the list of merge sets and mapping information associated with managed property to target merge set mappings. In an embodiment, the process 400 can use a schema engine configured to retrieve or receive the list of merge sets from an indexing component, and refer to a schema mapping database that defines a managed property to merge set association or mapping. For example, mappings can be defined between a managed property (e.g., author, ACL, creation date, etc.) and the merge set or sets in use (basic, security, linkAnalysis, etc.).

At 410, the process 400 operates to process the item including checking or identifying a merge set or sets that the item properties belong to. At 412, the process 400 operates to loop through the existing merge sets, extract names and values of properties for each merge set, and/or update the merge set and associated indexing structure with the property names and values to finally create all indexing structures. In an embodiment, at 412, the process operates to write the created index structures to a store or storage medium (e.g., local and/or remote locations). At 414, the process 400 operates to use the indexing structure(s) to serve queries and provide search results. While a certain number and order of operations is described for the exemplary flow of FIG. 4, it will be appreciated that other numbers and/or orders can be used according to desired implementations.

Exemplary pseudo code below describes operations performed by an indexing service as part of providing partial update support.

```
// First the system sets up mappings from all managed
properties in the schema to merge sets:
    PropertyToMergeSetMapping = GetMappings( ) // Get
    mappings
    MergeSetUpdates = new MergeSetUpdateStructure(item);
    // Then, for every item, each managed property of the item is
routed to the correct merge set in a temporary memory structure, orga-
nized
by merge sets:
        For every managed property mp of the current item
            CurrentMergeSet = GetMergeSetMapping(mp)
            MergeSetUpdates[CurrentMergeSet].SetValue(mp.name,
            mp.value)
    // Afterwards, the indexing structures of each changed merge
set are updated with new content:
        For every MergeSet in MergeSetUpdates
            UpdateMergeSet(MergeSet)
```

While certain embodiments are described herein, other embodiments are available, and the described embodiments should not be used to limit the claims. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and/or components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and/or other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components/systems can include any of a type, number, and/or combination of networks and the corresponding network components include, but are not limited to, wide area networks (WANs), local area networks (LANs), metropolitan area networks (MANs), proprietary networks, backend networks, cellular, satellite, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 5:
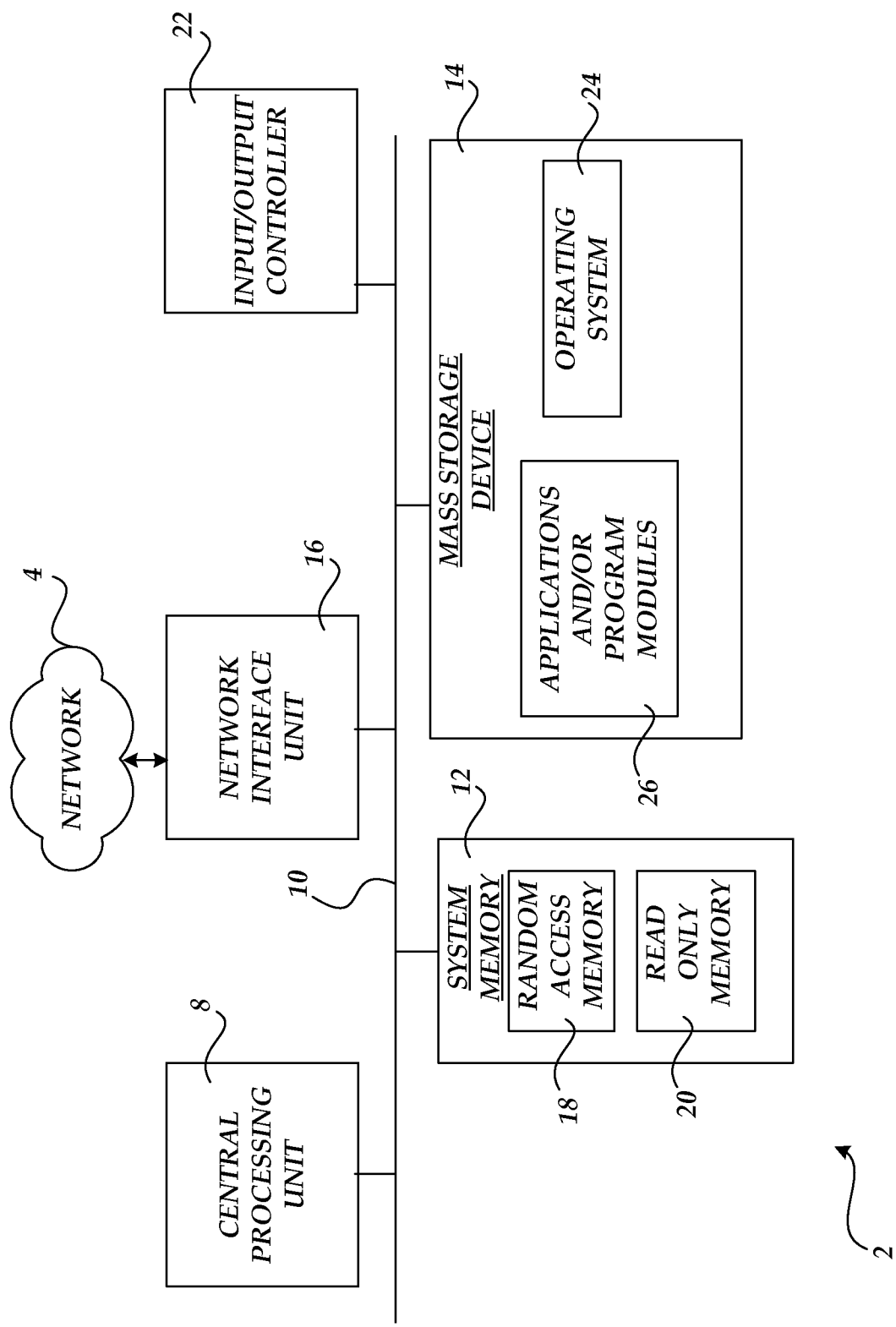
FIG. 5 is a block diagram illustrating an exemplary computing environment for implementation of various embodiments described herein.

Referring now to FIG. 5, the following discussion is intended to provide a brief, general description of a suitable computing environment in which embodiments of the invention may be implemented. While embodiment of the invention can be described in the general context of program modules that execute in conjunction with program modules that run on an operating system on a personal or other computer, those skilled in the art will recognize that the invention may also be implemented in combination with other types of computer systems, devices, and program modules.

Generally, program modules include routines, programs, components, data structures, and other types of structures that perform particular tasks or implement particular abstract data types. Moreover, those skilled in the art will appreciate that embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   creating a set of partial updates for an electronic document, wherein creating the set of partial updates comprises:
   parsing the electronic document to determine a set of document properties;
   using the set of document properties to create a set of managed document properties, wherein the set of managed document properties represent abstractions of one or more document properties in the set of document properties;

identifying a first merge set associated with the set of managed document properties, wherein the first merge set groups one or more of the managed document properties based on at least one of update parameters or usage parameters according to a first merge group type, and wherein the first merge set is associated with document properties from a first data source;

populating the first merge set using the corresponding managed document properties from the set of managed document properties, wherein the populated first merge set represents a first set of partial updates for the electronic document;

identifying a second merge set associated with the set of managed document properties, wherein the second merge set groups one or more of the managed document properties based on at least one of the update parameters or the usage parameters according to a second merge group type, and wherein the second merge set is associated with document properties from a second data source;

populating the second merge set using the corresponding managed document properties from the set of managed document properties, wherein the populated second merge set represents a second set of partial updates for the electronic document;

using the first merge set to update a first portion of the electronic document, wherein updating the first portion of the electronic document comprises retrieving information from the first data source; and using the second merge set to update a second portion of the electronic document, wherein updating the second portion of the electronic document comprises retrieving information from the second data source.

2. The method of claim 1, further comprising:
receiving the electronic document comprising a set of submitted properties; and
transforming the set of submitted properties into a set of managed document properties.

3. The method of claim 1, wherein the first merge set is used to target one or more merge set mappings, the one or more merge set mappings defining an association between the set of managed document properties and the first merge set.

4. The method of claim 1, wherein schema information is used to update an indexing structure associated with the first merge set and the second merge set.

5. The method of claim 1, wherein providing the first set of partial updates and the second set of partial updates comprises updating two or more portions of the electronic document without updating the entire electronic document.

6. The method of claim 1, wherein a configurable schema is used to define how the set of managed document properties are to be grouped in the first merge set and the second merge set.

7. The method of claim 6, wherein the one or more indexes are created based on data from the electronic document.

8. The method of claim 1, wherein the first merge set is used to update one or more indexes, wherein the one or more indexes are grouped based on at least one of an expected usage and an update cycle.

9. The method of claim 1, wherein the set of managed document properties includes at least one of: security information, document identifiers, document body content, metadata, search engine facts, usage related information, recommendation-related information, extracted entities, and web structure information.

10. The method of claim 1, wherein the first merge type and the second merge group type each correspond to at least one of:
a default group type for main document properties of the electronic document;
a security group type for security properties of the electronic document; or
a link group type for properties associated with how the electronic document relates to other documents; and
wherein the first merge type and the second merge group type are different.

11. A system comprising:
a schema management component configured to create a set of partial updates for an electronic document, wherein creating the set of partial updates comprises:
managing a configurable schema used in part to convert group properties of the electronic document into a set of managed document properties, wherein the set of managed document properties represent abstractions of one or more document properties in the set of document properties; and
grouping the set of managed document properties into one or more merge sets, wherein the one or more merge sets each group one or more of the managed document properties based on at least one of update parameters or usage parameters according to a respective merge group type and wherein each of the one or more merge sets is associated with document properties having the same data source; and
a search engine configured to apply the set of partial updates to the electronic document, wherein applying the set of partial updates comprises:
using the one or more merge sets to update indexed portions of the electronic document, wherein the search engine operates to group parts of the electronic document into a plurality of independent indexes based on the configurable schema to manage one or more document attributes, and wherein updating the indexed portions of the electronic document comprises retrieving information from the data source associated with the respective one or more merge sets.

12. The system of claim 11, wherein the one or more merge sets are further populated according to a link group type for properties identifying relationships between documents.

13. The system of claim 11, wherein designated parts of the electronic document can be updated independently of other parts of the electronic document.

14. The system of claim 11, wherein the search engine is further configured to update the one or more merge sets based in part on at least one of existing document content, web structure properties, and recommendation properties.

15. The system of claim 11, wherein the one or more merge sets are populated based in part on an assigned document identifier of the electronic document.

16. The system of claim 11, wherein the schema management component is configured to perform operations based in part on whether an operation is a partial update operation, an add operation, or a delete operation.

17. A system comprising:
at least one processor; and
memory coupled to the at least one processor, the memory comprising computer executable instructions that, when executed by the at least one processor, performs a method for creating a set of partial updates for an electronic document, wherein creating the set of partial updates comprises:
parsing an electronic document to determine a set of document properties;
using the set of document properties to create a set of managed document properties, wherein the set of managed document properties represent abstractions of one or more document properties in the set of document properties;
identifying one or more merge sets associated with the set of managed document properties, wherein each of the one or more merge sets groups one or more of the managed document properties based on at least one of update parameters or usage parameters according to a respective merge group type, and wherein each of the one or more merge sets is associated with document properties having the same data source;
populating the one or more merges sets using the corresponding managed document properties from the set of managed document properties, wherein the populated one or more merge sets represent a first set of partial updates for the electronic document; and
using at least one of the one or more merge sets to update a portion of the electronic document, wherein updating the portion of the electronic document comprises retrieving information from the data source associated with the respective one or more merge sets.

18. The system of claim 17, further comprising:
creating one or more indexing structures for the plurality of managed document properties.

19. The system of claim 17, further comprising:
receiving a query;
identifying search terms in the query; and
using the identified search terms, generating a result set comprising document properties from one or more merge sets.

20. The system of claim 17, wherein providing partial updates comprises updating one or more portions of the electronic document without updating the entire electronic document.

* * * * *